UNITED STATES PATENT OFFICE.

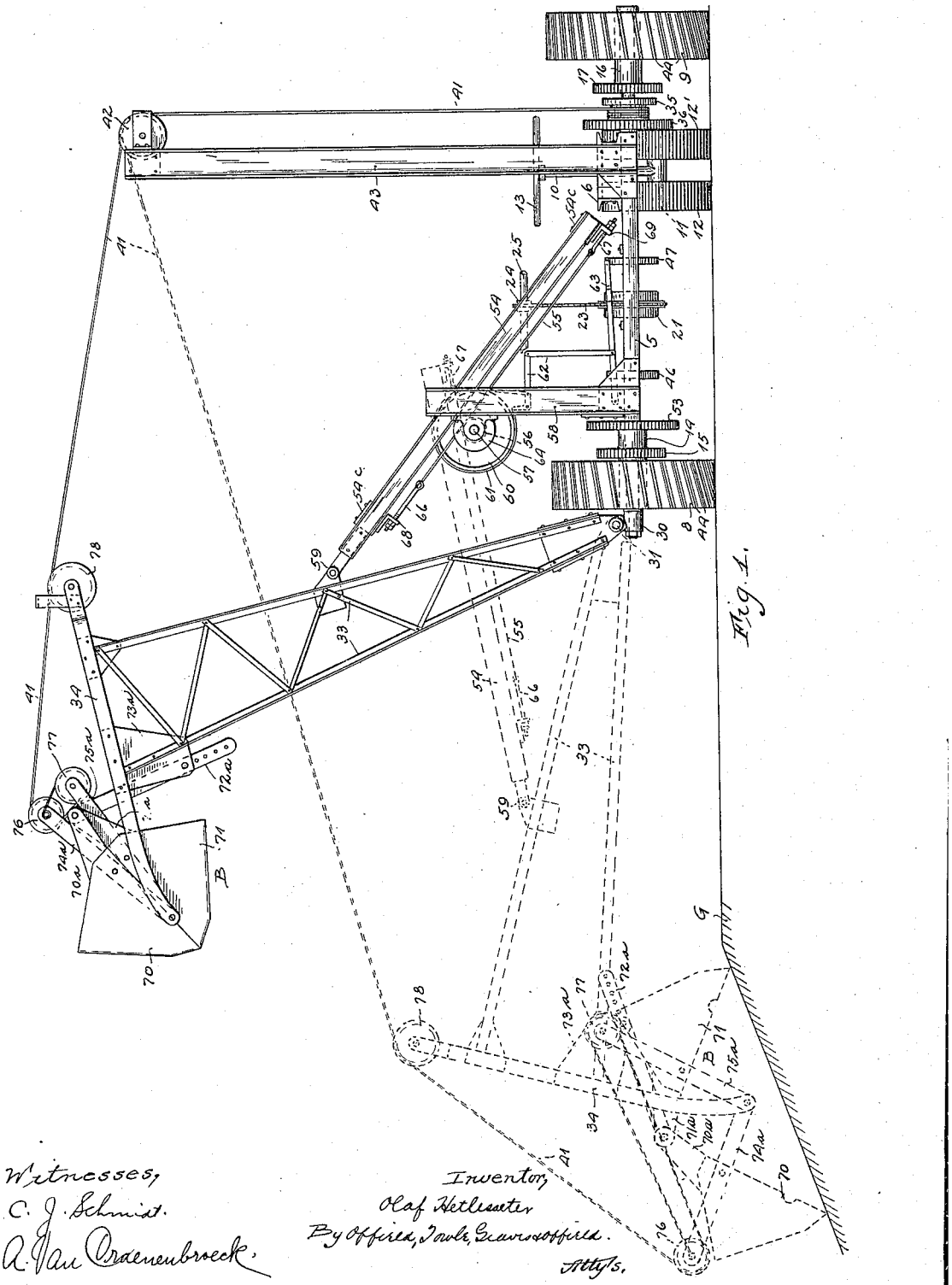

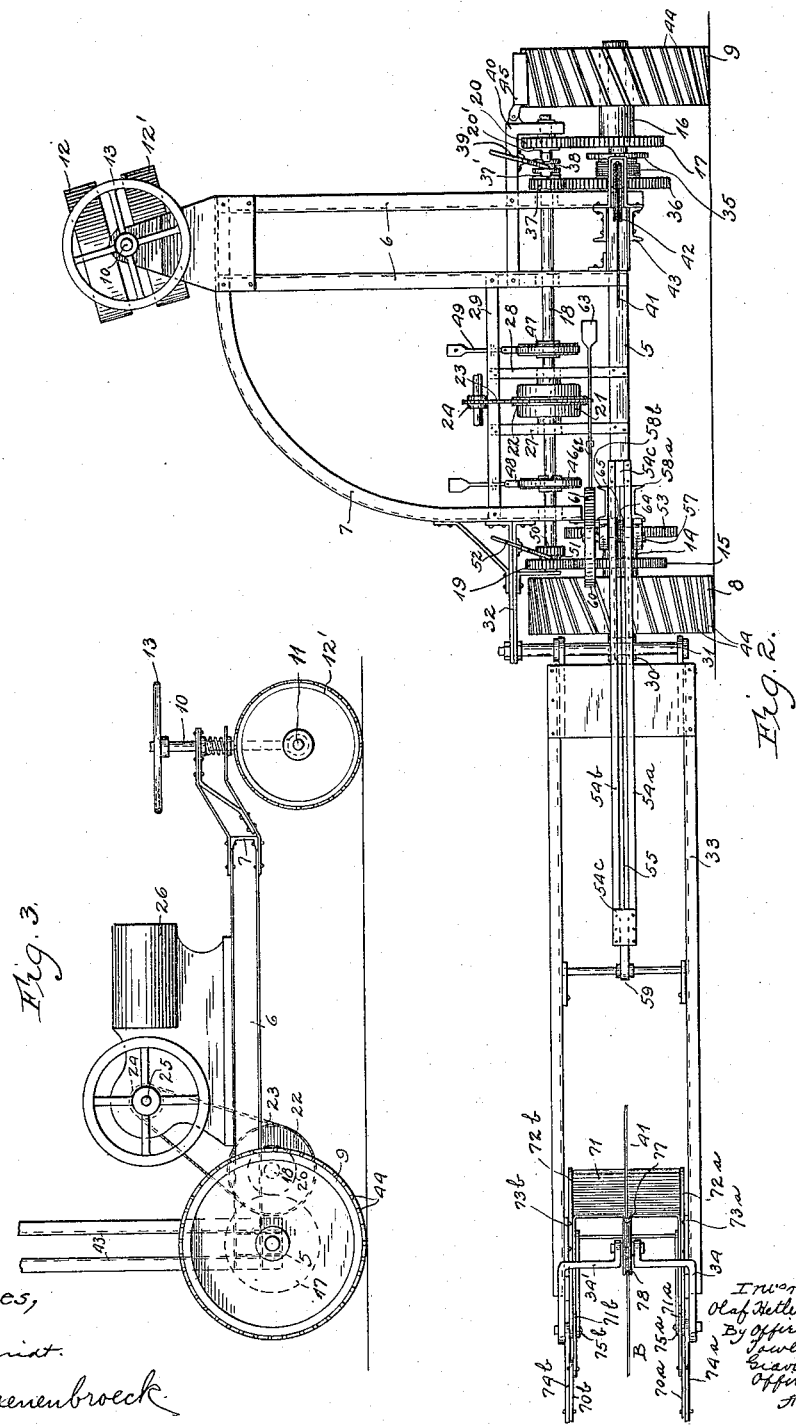

OLAF HETLESAETER, OF CHICAGO, ILLINOIS.

EXCAVATING-MACHINE.

1,170,905.          Specification of Letters Patent.          Patented Feb. 8, 1916.

Application filed February 11, 1914. Serial No. 817,988.

*To all whom it may concern:*

Be it known that I, OLAF HETLESAETER, a citizen of the United States, and a resident of Chicago, in the county of Cook and State of Illinois, have invented certain new and useful Improvements in Excavating-Machines, of which the following is a specification.

My invention relates to excavating machines, particularly to that class of self-propelled machines which are to be utilized for excavating, ditching and grading purposes.

Among the important objects of the invention are to provide a light but strong machine; to provide means for locking one of the traction wheels and for revolving the machine supporting structure about such locked wheel as a center; to provide a boom pivoted to the vehicle structure and adapted to swing only in a vertical plane but to be carried bodily laterally with the vehicle structure upon revolving of such structure about the locked wheel; to provide improved bucket mechanism and fixed pivot connection thereof with the boom structure; to provide improved link mechanism for controlling the opening and closing of the bucket and to associate such link mechanism with the hoisting rope in such manner that tension applied to the rope will first cause closing of the bucket and then raising of the boom; to provide improved means for retarding or locking the boom independently of the hoisting rope; to provide improved means for adjusting the angle of the bucket with reference to the boom; and in general to provide a light and strong machine which is capable of heavy digging, and which has a wide conveying and dumping range.

In the accompanying drawings the various features of the invention are clearly illustrated, and in these drawings—

Figure 1 is a front elevational view of an excavating machine embodying the various features, Fig. 2 is a plan view, Fig. 3 is a side elevational view.

Referring to the drawings, the supporting vehicle structure comprises the axle 5 rigidly secured to the front end of the reach beam structure 6, and to the front end of a bracket beam 7 secured to and extending from the structure 6. At the ends of the axle 5 are journaled drive wheels 8 and 9 and at the end of the reach beam structure 6 a vertical steering shaft or post 10 carries the short axle 11 supporting the wheels 12 and 12', the top of the post 10 being connected to suitable steering lever or wheel mechanism 13. By manipulating the steering wheel mechanism the direction of travel of the vehicle can be controlled as will be readily understood.

Rotatable on the axle 5 but locked to the wheel 8 is a hub 14 carrying a gear wheel 15, and rotatable on the axle adjacent the wheel 9 a similar hub 16 carrying a gear wheel 17 is provided, the hub being locked to the wheel. Extending parallel with the axle is a drive shaft 18 journaled in suitable bearings provided in the structures 6 and 7 and mounting the drive pinions 19 and 20 meshing respectively with the gears 15 and 17 on the axle. The shaft 18 is divided into two sections connected in a well known manner by differential mechanism mounted in casing 21, the drive pinion 19 being carried on one section and the pinion 20 on the other. A sprocket 22 on the casing 21 is shown connected by a chain 23 with a driving sprocket 24 carried on the drive shaft 25 of a suitable driving source such as a gas engine 26 mounted on the structure 6. In order to strengthen the shaft 18, bearings are provided therefor in cross beams 27 and 28 adjacent the differential housing and extending between the axle 5 and the beam 29 connecting the main structure 6 with the structure 7 of the vehicle body.

The axle 5 just outside the wheel 8 has rigidly secured thereto a block 30 which rigidly mounts the horizontal pivot shaft 31 which is held in such horizontal position by a bracket structure 32 extending from the vehicle body beam 7. The boom structure 33 pivots at its lower end on the shaft 31, this boom structure being preferably built up of structural steel parts and carries at its upper end cross beams 34 and 34' to whose outer ends suitable clam shell bucket mechanism B is pivoted. Mounted on the axle between the wheel 9 and the vehicle body structure 6 is a hoisting drum 35 carrying a gear 36 which meshes with a drive pinion 37 on drive shaft 18. A clutch collar 38 is slidable on the drive shaft between the pinions 37 and 20 and is adapted to coöperate with clutch extensions 37' and 20' respectively on gears 37 and 20 in order that either gear may be locked to the drive shaft to cause either drive of the wheel 9 or drive of the hoisting drum. Suitable fork lever mechanism 39 is provided for shifting the clutch collar and may be supported on a bracket 40 extending laterally from the vehicle body structure 6. Preferably the outer end of this bracket is deflected at right angles to the shaft 18 to form a supporting bearing for the end thereof.

The hoisting drum 35 receives the rope or cable 41 which passes over a suitable sheave 42 mounted at the upper end of a guide tower 43, passing from thence to the boom structure and bucket thereon. Upon winding up of the cable on the drum the boom is raised, and the boom is lowered by gravity upon playing out of the cable from the drum.

It will be noted that the boom structure can swing only in the vertical plane of the axle 5 and that the center of gravity of the boom structure is always in such plane. The manner in which lateral travel of the boom is effected in order to transport the bucket from its excavating position to its dumping destination constitutes one of the important objects of the invention. To accomplish such movement of the boom I provide for locking of the guide wheel 9 against rotation and for effecting propulsion of the wheel 8 to rotate the vehicle body with the boom thereon around the wheel 9 as a center. Such bodily movement of the boom together with its swinging movement about its pivot shaft will enable the bucket to be carried to any desired location.

In order to effect locking of the wheel 9 any suitable mechanism may be provided. As shown, the wheels 8 and 9 are provided with traction louvers 44 and a detent frame 45 pivoted to the bracket 40 is provided to be swung away from the wheel 9 to allow propulsion or to be moved into locking engagement with the louvers to lock the wheel against rotation. The respective sections of the drive shaft 18 are provided with brake wheels 46 and 47 to be controlled by suitable brake mechanism 48 and 49 respectively, mounted in any suitable manner on the vehicle framework. If, now, it is desired to swing the entire structure around wheel 9, the brake mechanism associated with brake wheel 47 is actuated to prevent rotation of the shaft section associated with the wheel 9, the wheel 9 being of course blocked by applying the detent 45 thereto. Upon driving of the differential housing by the engine only the shaft section leading to wheel 8 will rotate and such rotation is transmitted to the drive pinion 19, then to gear 15, and thence to traction wheel 8, the vehicle structure then revolving around wheel 9 as a center in a direction depending upon the direction of travel of the engine. When one differential shaft section is blocked the other section will be driven at double speed. In order to give better control of the wheel 8 and to allow slower and more powerful propulsion thereof, a smaller drive pinion 50 is provided and secured to the hub 51 which carries the pinion 19 and which is slidable on the drive shaft. Suitable shifting mechanism 52 may be provided on the vehicle framework to effect shift of the hub 51 to either mesh the pinion 19 with gear 15 or to mesh pinion 50 with a gear 53 secured to the hub 14 which is locked to wheel 8 and which carries the gear 15.

When it is desired to hold the vehicle at rest and to operate the hoisting drum, the brake mechanism is applied to brake wheel 46 to allow rotation only of the drive shaft section connected with the hoisting drum, the drum being then rotated as soon as the clutch collar 38 is clutched to the pinion 37. As will be shown later in the detailed description of the bucket mechanism, the hoisting rope is connected with a clam shell bucket in such a manner that tension on the rope will effect closure of the bucket and slacking of the rope will allow the bucket to open by gravity. I therefore provide means for holding the boom independently of the hoisting rope in any position to which it was swung by the hoisting rope or by gravity. Such holding mechanism is in the form of a beam structure 54 which supports at its ends a rope or cable 55 looped about a brake drum 56 mounted on shaft 57 which is journaled on the standard 58 rising vertically from the axle 5 between the boom and the hoisting rope tower 43. The beam 54 is pivoted at 59 to the boom structure 33. One end of the shaft 57 carries a brake wheel 60 engaged by a brake strap 61 whose ends are connected with suitable lever mechanism 62 controllable preferably by a pedal 63. When the boom is to be raised and lowered by operation of the hoisting rope, the pedal is released to free the brake and to allow ready travel of the beam structure 54, and when it is desired to lock the boom in any position the pedal is depressed to lock the brake band to the brake wheel and to lock the beam 54 against movement by virtue of the frictional engagement of the turns of the cable 55 with the drum 56. The movements of the boom can also be controlled by applying more or less braking effort to retard the movement of the beam 54 and therefore of the boom. In order to provide a support or guide-way for the structure 54, the construction shown is very efficient. As shown, the structure 54 comprises two channel beams 54$^a$ and 54$^b$ held together by plates 54$^c$, these channels riding on wheels 64 and 65, secured to the ends of the drum 56, the standard 58 comprising two beams 58$^a$ and 58$^b$ which support the respective ends of the drum shaft 57. The cable 55 can readily pass about the drum between the wheels 64 and 65, and in order to permit of adjusting the tension of the cable its ends are connected by eye-bolts 66 and 67 with brackets 68 and 69 extending downwardly from the structure 54.

After the boom has been lowered to bring the open bucket into engagement with the material to be conveyed, the hoisting drum is driven to put tension on the hoisting rope, the result being that the bucket is first closed and the boom then raised. The pedal 63 is then actuated to effect locking of the beam 54 and holding of the boom in its raised position independently of the hoisting rope in order that said rope may be slacked to allow opening of the bucket by gravity and dumping of its contents. Release of the drum to allow the rope to slack is accomplished by unclutching the clutch 38 from the drum driving pinion 37. If, after raising of the boom with the filled bucket it is desired to revolve the vehicle to carry the bucket to its dumping destination, the beam 54 is first locked by depressing the brake pedal to actuate brake mechanism 61, and wheel 8 is then propelled, wheel 9 being of course first locked against rotation. When the bucket reaches its dumping destination, the hoisting rope is slacked to allow the bucket to open. When the vehicle is revolved back to bring the boom into the vertical excavating plane, the brake mechanism is operated to release the beam 54 more or less to allow the boom to swing down to carry the bucket into engagement with the surface to be excavated, the beam 54 being then entirely released to allow the bucket to dig in, and then the hoisting drum is operated to effect first closing of the bucket and then raising of the boom in the manner above described. When the vehicle is to be swung around the locked wheel 9, the steering wheel mechanism 13 is first adjusted to bring the wheels 12 and 12' at right angles to the line passing through the center of wheel 9 and the steering post 10, such positioning allowing ready rotation of the structure.

Describing now the bucket mechanism B, this is preferably of the clam shell type, and one of the important features of the invention resides in fixedly pivoting the bucket halves to the boom structure and in utilizing the boom structure hoisting rope for controlling the opening and closing of the bucket. The bucket halves 70 and 71 of the bucket structure have at their sides respectively the extensions $70^a$, $70^b$, and $71^a$, $71^b$, the extensions $70^a$ and $71^a$ being pivoted together and to the outer end of a radius link $72^a$, while the extensions $70^b$ and $71^b$ are pivoted together and to the outer end of a radius link $72^b$, these links being pivoted at their inner ends to the plates $73^a$ and $73^b$ respectively, secured to the boom structure. Pivoted to the opposite sides of the bucket 70 are the links $74^a$ and $74^b$; while in a similar manner the bucket half 71 is at its opposite sides pivoted to links $75^a$ and $75^b$, respectively. The outer ends of links $74^a$ and $75^a$ are pivoted to the outer end of the crossbeam 34 on the boom structure, while the links $74^b$ and $75^b$ are pivoted at their outer ends to the end of the other beam 34'. Pivoted between the inner ends of the links $74^a$ and $74^b$ is a sheave 76, and pivoted between the outer ends of the links $75^a$ and $75^b$ is a sheave 77, the hoisting cable 41 passing first about sheave 76, then about sheave 77, and then being anchored to the inner end of link structure $74^a$, $74^b$. The bucket supporting links are preferably all of the same length and the pivot connections of the bucket halves with the links are equidistant from the ends of the respective supporting beams 34, 34' and are equidistant from the pivot line of the bucket extensions $70^a$ and $71^a$. With this arrangement tension on the hoisting rope will cause the sheave ends of the link structures to be drawn together, this resulting in swing of the bucket halves to closed position. The bucket structures are also preferably so weighted that when the hoisting cable is slacked the bucket halves will swing to open position by the force of gravity. In order to assist in guiding the hoisting cable, a sheave 78 may be journaled between the inner ends of the beams 34 and 34'.

In Fig. 1 the full lines show the boom raised and the bucket closed, while the dotted lines show the boom lowered and the bucket open. The bucket rests with the edges of the open halves on the ground G to be excavated. Tension is then applied to the hoisting cable by operating the hoisting drum, such tension causing the bucket halves to be brought together in a manner above described, the bucket edges digging into and scooping up the earth. On loose earth the weight of the bucket together with the weight of the boom thereon will be sufficient to cause the bucket to dig in and scoop up when the hoisting rope is thus tensioned. Where the ground is harder, or other obstructions are encountered, the weight on the bucket can be increased by locking the beam 54, the greater part of the vehicle structure being then available to resist raising of the boom, whereupon the bucket halves are driven into the ground under great pressure. As soon as the bucket is closed and filled the locking beam 54 is released and then the hoisting drum operated to raise the boom with the closed bucket. If, in order to reach the dumping destination, it is necessary to revolve the supporting structure, the wheel 9 is blocked and the various clutch mechanisms controlled in a manner already described, so that the wheel 8 will be propelled and the structure revolved about the locked wheel 9. When the dumping destination is reached, the beam 54 is securely locked to hold the boom in its raised position in order that the hoisting cable may be slacked to allow opening of the bucket and dumping of its contents. After such dumping the vehicle is revolved back into the excavating plane and the brake mechanism for controlling beam 54 is released and the boom lowered, the hoisting cable remaining slack during such lowering of the boom in order that the bucket may engage the ground in its open position. The hoisting drum is then again operated to effect first closing and filling of the bucket and then raising of the boom in the manner described. The fixed pivot arrangement of the bucket halves relative to the boom structure gives the bucket definite position at all times with reference to the boom structure and the bucket can be accurately guided into engagement with the material to be excavated or conveyed. The fixed connection of the bucket also makes it possible to apply the greater part of the weight of the entire bucket supporting structure to the bucket, the bucket being then able to dig into comparatively hard earth and to readily overcome other obstructions without overstraining any supporting structure parts.

The inner ends of the radius links 72ª and 72ᵇ are preferably provided with a plurality of pivot holes as indicated in order that the radius length can be varied to thereby change the angle of the bucket mechanism with reference to the boom. The bucket can thus be adjusted on the boom so that when the boom is lowered the bucket half edges will engage in the best possible manner with the material to be excavated.

It will also be noted that the hoisting tower 43 and the standard supporting the brake mechanism for locking beam 54, are secured only at their lower end to the vehicle framework. These parts are therefore more or less yielding and free to give, the result being that the various excavating, hoisting and dumping operations are free from jars and jerks.

I do not of course desire to be limited to the exact construction and arrangement shown and described as changes and modifications might be possible which would still come within the scope of the invention.

I claim the following:

1. In an excavator, the combination of a vehicle body having an axle and two propulsion wheels thereon, a bucket supporting boom extending from said axle, a source of power on said body, driving connections between said source and said propulsion wheels, and means for locking one of said wheels against propulsion and for allowing propulsion only of the other wheel to effect rotation of the vehicle body about the locked wheel as a center.

2. In an excavator, the combination of a vehicle body, an axle, propulsion wheels on said axle, a boom mounted on said axle, a driving shaft section connected with the respective wheels and connected by differential drive mechanism, a source of power on said vehicle body having connection with said differential driving mechanism, and means for locking one of said wheels against propulsion and for allowing propulsion of the other wheel whereby to effect rotation of said vehicle body about the locked wheel as a center.

3. In an excavator, the combination of a supporting body, an axle, two supporting wheels on said axle, a source of power on said supporting body, a driving train for connecting said source with one of said wheels and means for locking the other wheel against rotation whereby said body may be rotated about the locked wheel as a center, and excavating mechanism supported on the axle adjacent one of said wheels.

4. In an excavator, the combination of a supporting body, an axle, supporting wheels on said axle, a driving source on said body, means for connecting either of said wheels in driving relation with said source and for preventing drive of the other wheel, and hoisting mechanism supported on one end of said axle.

5. In an excavator, the combination of an axle and a wheel pivoted at either end thereof, a vehicle body supported on said axle, a boom supported on said axle, a hoisting drum rotatable on said axle, a source of power on said body, means for connecting said source in driving relation with either of said wheels, and means for connecting said source in driving relation with said drum.

6. In an excavator, the combination of an axle, propulsion wheels on said axle, a body supported on said axle, a driving source on said body and means for connecting said source in driving connection with said wheels, a boom pivoted on said axle and adapted to swing in the vertical plane of the axle, a hoisting drum for said boom, and means for connecting said source in driving relation with said drum.

7. In an excavator, the combination of a vehicle structure comprising a body and an axle and wheels at the ends of said axle, a boom pivoted to said axle and adapted to swing only in the vertical plane thereof, controlling mechanism for the boom on said vehicle structure, and means for operating said mechanism.

8. In an excavator, the combination with a supporting structure comprising a body, an axle, and a wheel at each end of the axle, of driving means on the structure, means for connecting said driving means in driving relation with either wheel and means for preventing rotation of the other wheel whereby said structure may be revolved about the latter wheel, a boom mounted on one end of said axle, and controlling and operating mechanism for said boom mounted on the vehicle structure.

9. In an excavator, the combination with a main supporting structure comprising a body, a main axle, a traction wheel at each end of said axle, and steering mechanism, of two differential driving shaft sections and a driving train from each section to the corresponding wheel, differential drive mechanism connecting said sections and a driving source for said differential mechanism, a hoisting drum rotatable on said axle adjacent one of said wheels and a driving train from said drum to the differential driving shaft section associated with said wheel, clutch mechanism for connecting either said wheel driving train or the drum driving train with said driving shaft section, means for locking either driving shaft section against rotation, a bucket supporting boom mounted on said supporting structure, and a cable extending from said drum to said boom.

10. In an excavator, the combination with a main supporting structure comprising a body, a main axle, a traction wheel at each end of said axle, and steering mechanism, of two differential driving shaft sections and a driving train from each section to the corresponding wheel, differential drive mechanism connecting said sections and a driving source for said differential mechanism, a hoisting drum rotatable on said axle adjacent one of said wheels and a driving train from said drum to the differential driving shaft section associated with said wheel, clutch mechanism for connecting either said wheel driving train or the drum driving train with said driving shaft section, means for locking either driving shaft section against rotation, a bucket supporting boom pivoted at one end of said axle, and a cable passing from said drum to said boom.

11. In an excavator, the combination with a main supporting structure comprising a body, a main axle, a traction wheel at each end of said axle, and steering mechanism, of two differential driving shaft sections and a driving train from each section to the corresponding wheel, differential drive mechanism connecting said sections and a driving source for said differential mechanism, a hoisting drum rotatable on said axle adjacent one of said wheels and a driving train from said drum to the differential driving shaft section associated with said wheel, clutch mechanism for connecting either said wheel driving train or the drum driving train with said driving shaft section, means for locking either driving shaft section against rotation, a bucket supporting boom pivoted at one end of said axle to swing only in the vertical plane of said axle, and a cable extending from said drum to said boom.

12. In an excavator, the combination with a main supporting structure comprising a body, a main axle, a traction wheel at each end of said axle, and steering mechanism, of two differential driving shaft sections and a driving train from each section to the corresponding wheel, differential drive mechanism connecting said sections and a driving source for said differential mechanism, a hoisting drum rotatable on said axle adjacent one of said wheels and a driving train from said drum to the differential driving shaft section associated with said wheel, clutch mechanism for connecting either said wheel driving train or the drum driving train with said driving shaft section, means for locking either driving shaft section against rotation, a bucket supporting boom mounted on said supporting structure, a cable extending from said drum to said boom, and means for locking one of said wheels against rotation.

13. In an excavator, the combination of a supporting structure, a boom structure pivoted on said structure to swing in a vertical plane, two link structures pivoted at their outer ends to said boom structure and sheaves journaled at the inner ends of said link structures, a bucket half journaled to each link structure intermediate its ends, a radius link structure pivoted at its inner end to the boom structure and pivoted at its outer end to the inner ends of the bucket halves, a hoisting drum on said supporting structure, and a hoisting cable extending from said drum, said hoisting cable looping about both said sheaves and anchored at its outer end to one of said link structures, the pivot connections being such that tension on the hoisting cable will tend to swing the link structures together to effect rotation of the bucket halves to closed position.

14. In an excavator, the combination of a vehicle body having an axle, propulsion wheels on the ends of said axle, a boom pivoted on said axle adjacent one wheel, a tower extending vertically from the axle adjacent the other wheel, a hoisting drum on said axle adjacent said tower and a cable extending therefrom to said boom, driving mechanism, and means for selectively connecting said driving mechanism with said propulsion wheels or said drum.

15. In an excavating machine, the combination of a vehicle body having an axle, propulsion wheels mounted at the ends of said axle, a boom pivoted on the outer end of said axle adjacent one wheel and a standard mounted on said axle adjacent said wheel, a beam pivoted to said boom and slidably supported on said standard, brake mechanism for controlling said beam, a hoisting drum mounted on said axle adjacent said other wheel, a cable extending from said drum to said boom, and driving mechanism adapted to be connected with said driving wheels or said drum.

In witness whereof, I hereunto subscribe my name this 31st day of January, A. D. 1914.

OLAF HETLESAETER.

Witnesses:
CHARLES J. SCHMIDT,
EDMUND G. INGERSOLL.